US008794365B2

(12) United States Patent
Matsuzawa et al.

(10) Patent No.: US 8,794,365 B2
(45) Date of Patent: Aug. 5, 2014

(54) HYBRID VEHICLE

(75) Inventors: Susumu Matsuzawa, Kanagawa (JP);
Takashi Niiya, Aichi (JP)

(73) Assignees: Kanto Auto Works, Ltd., Kanagawa
(JP); **Toyota Jidosha Kabushiki
Kaisha**, Aichi (JP)

( * ) Notice: Subject to any disclaimer, the term of this patent is extended or adjusted under 35 U.S.C. 154(b) by 280 days.

(21) Appl. No.: 13/138,980

(22) PCT Filed: Apr. 14, 2010

(86) PCT No.: PCT/JP2010/002704
§ 371 (c)(1),
(2), (4) Date: Nov. 8, 2011

(87) PCT Pub. No.: WO2010/150447
PCT Pub. Date: Dec. 29, 2010

(65) Prior Publication Data
US 2012/0055722 A1 Mar. 8, 2012

(30) Foreign Application Priority Data
Jun. 23, 2009 (JP) ................................. 2009-148734

(51) Int. Cl.
*B60R 16/04* (2006.01)
(52) U.S. Cl.
USPC .................... 180/68.5; 180/65.21; 180/65.22; 180/69.1
(58) Field of Classification Search
USPC ........................ 180/68.5, 65.21, 65.22, 69.1
See application file for complete search history.

(56) References Cited

U.S. PATENT DOCUMENTS

| 5,193,635 A * | 3/1993 | Mizuno et al. ............. 180/65.25 |
| 2005/0011692 A1* | 1/2005 | Takahashi et al. ........... 180/68.5 |
| 2007/0215399 A1* | 9/2007 | Watanabe et al. ............ 180/68.5 |

FOREIGN PATENT DOCUMENTS

| JP | 04-080204 U1 | 7/1992 |
| JP | 2001-278127 A | 10/2001 |
| JP | 2002-165308 A | 7/2002 |
| JP | 2002-166728 A | 11/2002 |
| JP | 2004-161158 A | 10/2004 |
| JP | 4225363 B1 | 5/2008 |
| JP | 2008-239067 A | 9/2008 |

OTHER PUBLICATIONS

International Search Report mailed on May 25, 2010.

* cited by examiner

*Primary Examiner* — Hau Phan
*Assistant Examiner* — Bryan Evans
(74) *Attorney, Agent, or Firm* — Rader, Fishman & Grauer PLLC

(57) ABSTRACT

A main battery and an auxiliary battery are both mounted on a hybrid vehicle without narrowing a cargo room.
A floor panel 102 includes a rising portion 102c that rises upward and extends in a widthwise direction of a vehicle 101, and a front portion 102a extending forward from the rising portion 102c. A rear seat 109 is mounted above the floor panel 102 in such a manner that a seat portion 109a is parallel to the front portion. The front portion 102a, the seat portion 109a of the rear seat 109, and the rising portion 102c form a housing space SP for mounting a main battery 110 and an auxiliary battery 111 side by side in the widthwise direction of the vehicle.

7 Claims, 6 Drawing Sheets

HYBRID VEHICLE

TECHNICAL FIELD

The present invention relates to a hybrid vehicle including an engine and an electric motor, both of which are used as a power source.

BACKGROUND ART

Conventionally, a hybrid vehicle including, as a power source, both an engine and an electric motor has mounted thereto a battery (hereinafter sometimes referred to as a "main battery") for feeding power to the electric motor. When the main battery is arranged in a vehicle compartment, it narrows the interior space where passengers or luggage are accommodated.

A vehicle described in Patent Literature 1 secures a mounting space of an electric storage device below a rear seat in order to prevent a comfort in the vehicle compartment from being deteriorated due to the electric storage device. The Patent Literature 1 describes that not only a battery pack 600 but also another battery pack 2600 and a junction box 800 are mounted, and the battery pack 2600 is mounted on atop surface of a rising portion 110 as a third embodiment.

CITATION LIST

Patent Literature

[Patent Literature 1] Specification of Japanese Patent No. 4225363 (claim 9, paragraphs 0061 to 0065, FIG. 6)

SUMMARY OF INVENTION

Problems to be Solved by the Invention

A hybrid vehicle may have mounted thereto another battery (hereinafter sometimes referred to as an "auxiliary battery") for assisting a power supply by the main battery in order to supply a voltage to accessories such as an ECU (electronic control unit) operating with a low voltage (e.g., 12 V) or in order to prepare for troubles such as low battery charge of the main battery. However, since the hybrid vehicle is provided with an engine and an inverter in an engine compartment at the front part of the vehicle, a sufficient space for arranging the auxiliary battery cannot be secured in the engine compartment. Therefore, the place where the auxiliary battery is mounted becomes a problem.

As one example, it is considered that the auxiliary battery is mounted on the top surface of the rising portion of a floor panel at the rear of the rear seat as described in the Patent Literature 1. In this case, an interior space at the rear of the rear seat is decreased (see paragraph 0065 in Patent Literature 1).

As another example, it is also considered that the auxiliary battery is arranged in a space enclosed by a rear panel at the rear of a wheel house of a rear tire. When the auxiliary battery is arranged at the rear of the wheel house of the rear tire, the auxiliary battery might be damaged, when the rear part of the vehicle is hit. The arrangement of the auxiliary battery described above can be realized only in a sedan vehicle having a long rear overhang, and in a compact hatch-back vehicle having a short rear overhang, this arrangement cannot be realized without narrowing a cargo room.

The present invention aims to mount both a battery for driving an electric motor and a preparatory auxiliary battery to a hybrid vehicle without narrowing a cargo room.

Means for Solving the Problems

A hybrid vehicle according to the present invention includes: a floor panel including a rising portion that rises upward and extends in a widthwise direction of the vehicle, and a front portion that extends in a forward direction of the vehicle from the rising portion; a fuel tank that is mounted below the floor panel, and that stores liquid fuel burned in an engine serving as a power source of the vehicle; a rear seat provided above the floor panel with a seat portion which supports a hip of a passenger being opposite to the front portion; a first mounting portion that is formed in a housing space enclosed by the front portion, the seat portion, and the rising portion, so as to mount a first battery which stores driving power of an electric motor serving as the power source of the vehicle; and a second mounting portion that is formed in the housing space as being side by side with the first mounting portion in the widthwise direction of the vehicle so as to mount a second battery which assists a power supply by the first battery. The hybrid vehicle further includes: left and right side members, which extend in a longitudinal direction of the vehicle, and project upward from each of left and right sides of the front portion so as to support left and right sides of the seat portion of the rear seat with the top surfaces and define the side faces of the housing space in the widthwise direction of the vehicle.

Advantageous Effects of Invention

According to the present invention, two batteries can be arranged side by side below a rear seat. Accordingly, both the main battery and the auxiliary battery can be mounted on the hybrid vehicle without narrowing the cargo room.

DESCRIPTION OF EMBODIMENTS

Figure 1:
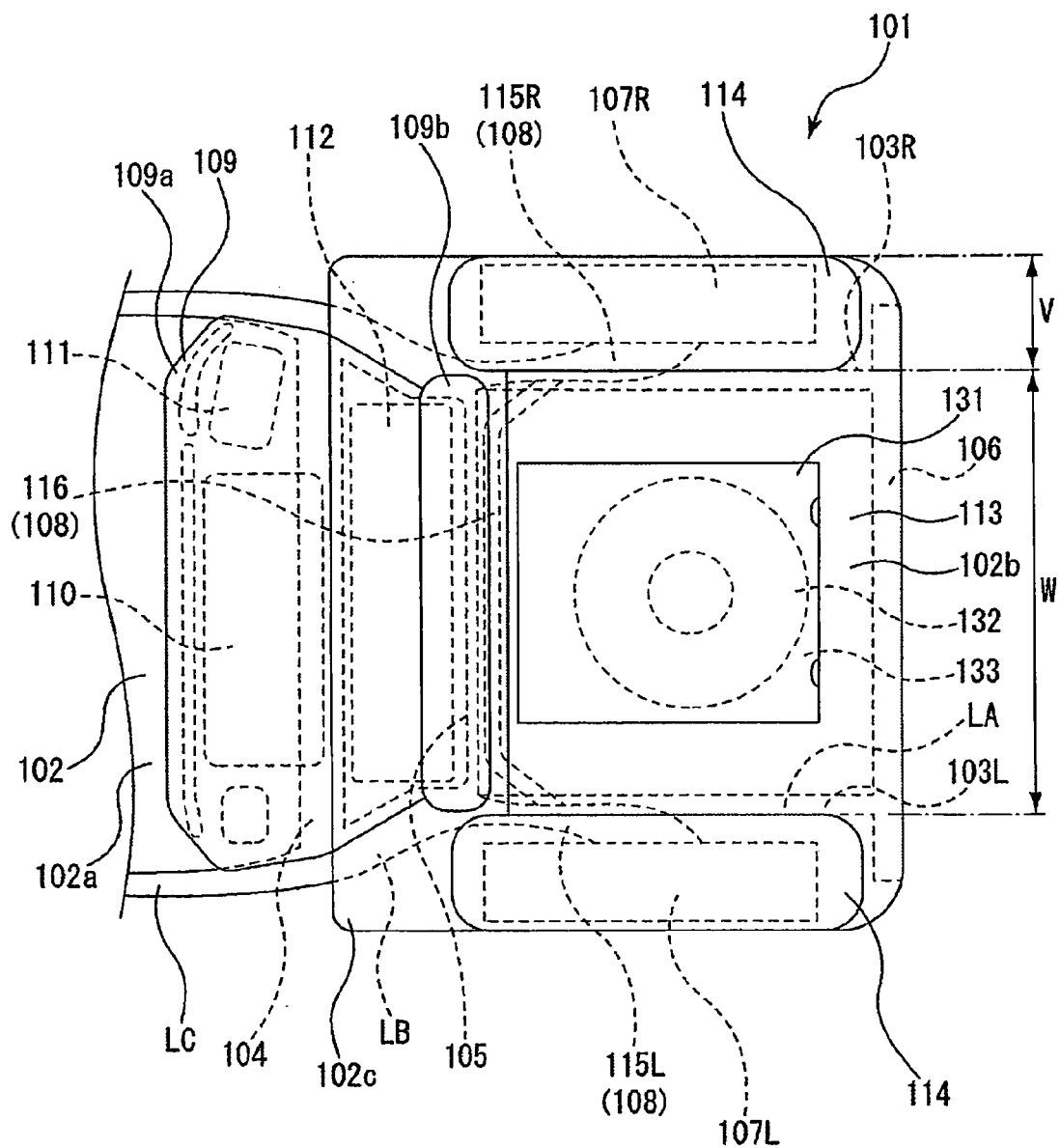
FIG. 1 is a plan view of a vehicle according to a first embodiment.

One embodiment will be described with reference to FIGS. 1 to 5. For the sake of convenience of description, the present invention is referred to as a first embodiment. FIG. 1 is a plan view of a vehicle 101. The vehicle 101 is a hybrid type including an engine and an electric motor (both are not illustrated), both of which are used as a power source. The vehicle 101 has an engine compartment (not illustrated) at its front part. In the vehicle 101, the engine, the electric motor, and an inverter (not illustrated) connected to the electric motor are mounted inside the engine compartment.

In the vehicle 101, a rear seat 109 is mounted. The vehicle 101 has, provided below or at the rear of the rear seat 109, a floor panel 102, a left side member 103L, a right side member 103R, a center cross member 104, a first rear cross member 105, a second rear cross member 106, a left rear tire 107L, a right rear tire 107R, a suspension member 108, a main battery 110 serving as a first battery, an auxiliary battery 111 serving as a second battery, a fuel tank 112, and a rear wheel house 114.

The floor panel 102 forms a floor surface of the interior of the vehicle 101. The floor panel 102 has a front portion 102a extending toward the front part of the vehicle 101 as extending substantially horizontally, and a rear portion 102b extending toward the rear of the vehicle 101. The floor panel 102 has a rising portion 102c between the front portion 102a and the rear portion 102b. The rising portion 102c projects upward from both the front portion 102a and the rear portion 102b of the floor panel 102, and forms a ridge extending in the widthwise direction of the vehicle 101. The first rear cross member 105 is positioned below the rising portion 102c.

The rear seat 109 includes a seat portion 109a that supports a hip of a passenger, and a backrest portion 109b that supports a back of the passenger. The backrest portion 109b projects upward from a trailing end of the seat portion 109a. The rear seat 109 is positioned above the floor panel 102 with the portion of the rear part of the lower surface of the seat portion 109a being supported by the rising portion 102c. In this case, the seat portion 109a is parallel to the front portion 102a, and is opposite to the front portion 102a.

A space in the vehicle 101 at the rear of the rear seat 109 is used as a cargo room 113. The backrest portion 109b of the rear seat 109 forms a front wall surface of the cargo room 113. The floor surface of the cargo room 113 is formed by the rear portion 102b and a spare tire accommodating portion cover 131. Specifically, a spare tire accommodating portion 133 for accommodating a spare tire 132 is formed to have a shape recessed downward at the rear portion 102b of the floor panel 102. The spare tire accommodating portion cover 131 is positioned above the spare tire 132 accommodated in the spare tire accommodating portion 133, and it covers the spare tire accommodating portion 133 so as to form the flat floor surface of the cargo room 113.

The rear wheel houses 114 are located at both right and left sides and at the rear part of the vehicle 101, and at both right and left sides of the cargo room 113, and they are arranged at the position at the rear of the rear seat 109. The rear wheel house 114 projects upward from the rear portion 102b of the floor panel 102. A left rear tire 107L is located below the left rear wheel house 114 so as to be rotatable. A right rear tire 107R is located below the right rear wheel house 114 so as to be rotatable. The right and left rear wheel houses 114 are covered by a rear panel (not illustrated) forming an outer appearance of the vehicle 101.

The left side member 103L and the right side member 103R are members extending in the longitudinal direction of the vehicle 101, and they are attached to regions on right and left sides of the floor panel 102. More specifically, the left side member 103L includes a portion LA extending in the longitudinal direction of the vehicle 101 along a right side of the left rear wheel house 114, a portion LB extending around from the portion LA toward an outer direction (leftward) of the vehicle 101 along the shape of the front part of the left rear wheel house 114, and a portion LC extending from the portion LB toward the front part as making close to the outer direction of the vehicle 101. On the other hand, the right side member 103R has substantially a symmetrical shape with the left side member 103L. Specifically, the left side member 103L and the right side member 103R extend in the longitudinal direction so as to expand in the outer direction of the vehicle 101 from the rear part toward the front part of the vehicle 101. The left side member 103L and the right side member 103R are located below the rear portion 102b of the floor panel 102 at the portion LA, while projects upward from the front portion 102a as being in contact with the side face of both sides of the front portion 102a of the floor panel 102 at the portion LC.

The center cross member 104, the first rear cross member 105, and the second rear cross member 106 are arranged in this order from the front part toward the rear part of the vehicle 101. The center cross member 104, the first rear cross member 105, and the second rear cross member 106 are attached on the bottom surface of the floor panel 102, and have a shape extending in the widthwise direction of the vehicle for connecting the left side member 103L and the right side member 103R, thereby enhancing rigidity of the vehicle 101. The center cross member 104 will be described later with reference to FIGS. 3 and 4. The first rear cross member 105 is mounted on the bottom surface of the rising portion 102c. The second rear cross member 106 is mounted on the bottom surface of the floor panel 102 at the rear end portion.

The suspension member 108 is a component of a suspension system of the vehicle 101. The suspension member 108 includes a left trailing arm 115L, a right trailing arm 115R, and an intermediate beam 116. The trailing end of the left trailing arm 115L is coupled to the left rear tire 107L via a shock absorber and a coil spring (both are not illustrated). The front end of the left trailing arm 115L is coupled to the left side member 103L. Similarly, the trailing end of the right trailing arm 115R is coupled to the right rear tire 107R via a shock absorber and a coil spring (both are not illustrated), and the front end of the right trailing arm 115R is coupled to the right side member 103R. The shock absorber and the coil spring absorb the vibration of the left rear tire 107L and the right rear tire 107R during when the vehicle 101 runs. The intermediate beam 116 is located at the rear of the rear seat 109 and below the floor panel 102 for coupling the left trailing arm 115L and the right trailing arm 115R.

Figure 2:
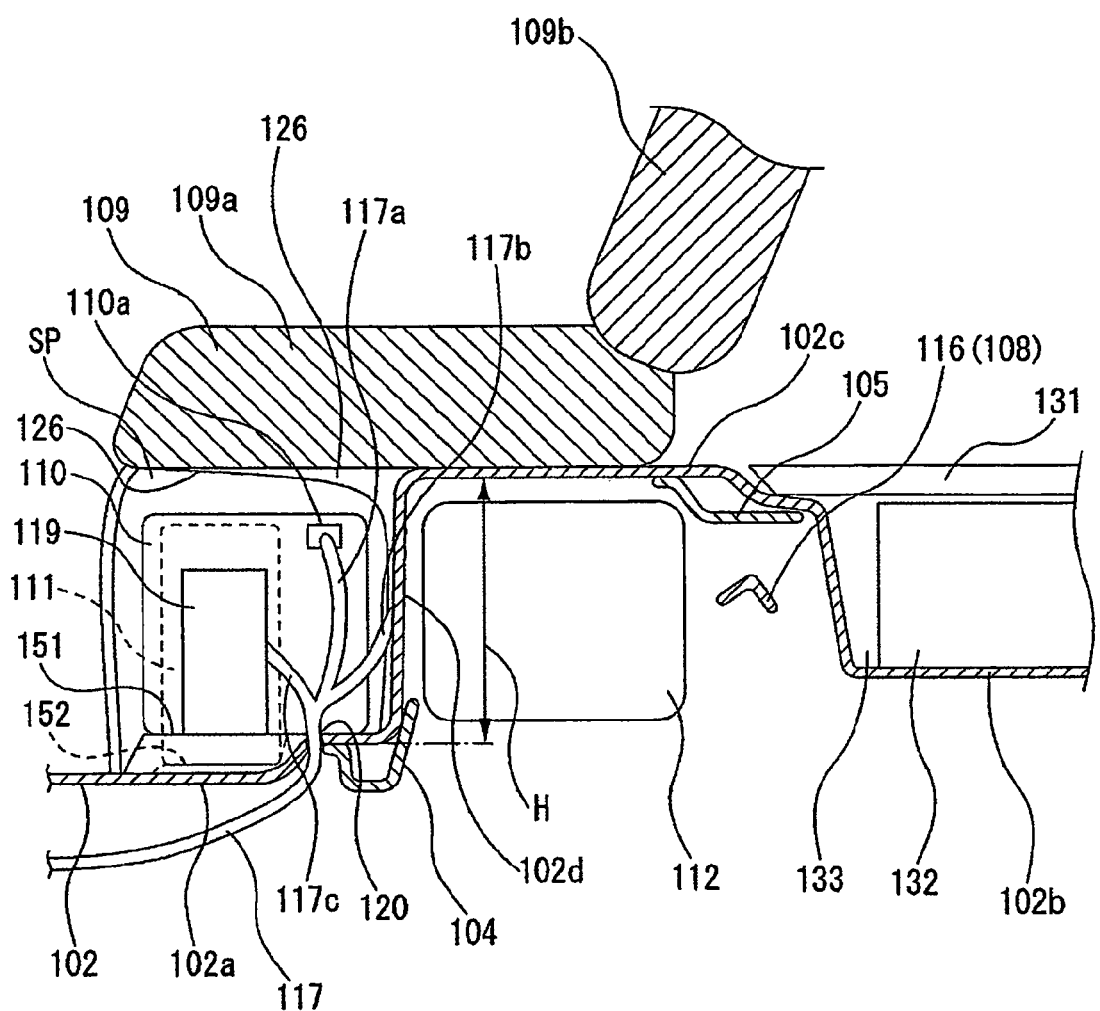
FIG. 2 is a left sectional view of the vehicle.

FIG. 2 is a left sectional view of the vehicle 101. The fuel tank 112 stores liquid fuel that is burned in an engine (not illustrated) serving as a power source of the vehicle 101. The liquid fuel is, for example, gasoline or alcohol. The fuel tank 112 has a filler tube (not illustrated) extending rearward and upward at the left end. The fuel tank 112 also has a full opening (not illustrated) at its upper end. The fuel tank 112 is located below the floor panel 102 so as to be housed in the rising portion 102c. The fuel tank 112 is located between the left trailing arm 115L and the right trailing arm 115R as avoiding the left trailing arm 115L, the right trailing arm 115R, the shock absorber, and the coil spring, and is fixed to the left side member 103L and the right side member 103R. The fuel tank 112 is located in front of the first rear cross member 105 and the intermediate beam 116, and has a shape for avoiding the interference with these members.

The seat portion 109a of the rear seat 109, the front portion 102a of the floor panel 102, and the rising portion 102c of the floor panel 102 form a housing space SP. A first mounting portion 151 for mounting the main battery 110, and a second mounting portion 152 for mounting the auxiliary battery 111 are formed side by side in the widthwise direction of the vehicle in the housing space SP. The main battery 110 is mounted in the first mounting portion 151, while the auxiliary battery 111 is mounted in the second mounting portion 152, and they are positioned in the housing space SP.

The upper part, rear part, and both right and left side parts of the housing space SP are covered by a frame 126. The frame 126 is made of a metal mesh, and is formed to have a shape covering the main battery 110, the auxiliary battery 111, and a blower motor 119. The rear part of the frame 126 forms a part of the rising portion 102c, and is in contact with the front face of the wall face 102d standing upward from the front portion 102a. The upper part of the frame 126 covers the main battery 110, the auxiliary battery 111, and the blower motor 119, and supports the bottom surface of the seat portion 109a of the rear seat 109.

The main battery 110, the auxiliary battery 111, and the blower motor 119 will be described here. The main battery 110 has a casing having an elongate and substantially rectangular shape. A secondary battery formed by connecting in series plural battery modules, having plural battery cells connected in series, is stored in the casing so as to accumulate driving power of the electric motor (not illustrated). The mainbattery 110 is arranged in the housing space SP in such a manner that the long side directs in the widthwise direction of the vehicle 101. The main battery 110 has a terminal 110a on a surface of the vehicle 101 that directs leftward when the main battery 110 is stored in the housing space SP. A pipe 111b (see FIG. 3) extends from the surface of the vehicle 101 that directs rightward when the main battery 110 is stored in the housing space SP. The pipe 111b is for discharging hydrogen, generated in the main battery 110, to the outside of the vehicle 101.

The main battery 110 is connected to the inverter (not illustrated) mounted to the engine compartment (not illustrated) via a wiring 117a mounted to the terminal 110a. The wiring 117a forms a part of a wire harness 117. The main battery 110 feeds electric power to various accessories (not illustrated), such as the electric motor, mounted to the vehicle 101, through the inverter. Electric power generated due to the drive of the motor is also stored in the main battery 110 via the inverter.

The blower motor 119 is stored in the housing space SP so as to be arranged at the left side of the main battery 110. The blower motor 119 is a drive source for a heater or an air conditioner (both are not illustrated) mounted to the vehicle 101, and further, blows cooling wind to the main battery 110 to cool the main battery 110. The length of the main battery 110 and the blower motor 119 in the widthwise direction of the vehicle 101 is substantially equal to a distance W (see FIG. 1) between rear wheel houses 114.

The auxiliary battery 111 is configured to store a secondary battery in a casing of substantially rectangular shape. A length of one side of the casing of the auxiliary battery 111 is substantially equal to a length V (see FIG. 1) of the rear wheel house 114 in the widthwise direction of the vehicle. The auxiliary battery 111 assists the power supply from the main battery 110 to the respective components of the vehicle 101. The power of the auxiliary battery 111 is not used for driving the vehicle 101, but used for the electric voltage supply to the accessories such as the unillustrated ECU (electronic control unit) operated with a low voltage (e.g., 12 V) or the blower motor 119, or for the drive of each component of the vehicle 101 when the main battery 110 is not charged. The auxiliary battery 111 has a terminal 111a (see FIG. 4) on its upper surface. Another wiring 117b that forms a part of the wire harness 117 is mounted to this terminal 111a. Specifically, the auxiliary battery 111 is connected in parallel to the main battery 110 with respect to the inverter provided in the engine compartment. The main battery 110 and the auxiliary battery 111 may be connected in series.

A junction box (not illustrated) is electrically connected between the main battery 110 and the auxiliary battery 111, and the inverter. The junction box has stored therein a system main relay for making a changeover between an electrical connection and disconnection between the main battery 110 and the auxiliary battery 111, and the inverter. Still another wiring 117c forming a part of the wire harness 117 is connected to a terminal (not illustrated) of the blower motor 119, and the blower motor 119 is driven by a power feeding from the main battery 110 and the auxiliary battery 111. A relay (not illustrated) is provided on the wiring that connects the main battery 110 and the blower motor 119.

The main battery 110 and the blower motor 119, which are arranged side by side in the widthwise direction of the vehicle, occupies the width corresponding to the distance W (see FIG. 1) as described above. Therefore, it is considered that the main battery 110 and the blower motor 119 are arranged in the vicinity of the backrest portion 109b of the rear seat 109 in the cargo room 113, for example. It is also considered that, since the length of one side of the casing of the auxiliary battery 111 is substantially equal to the length V (see FIG. 1), the mounting space for the auxiliary battery 111 is formed at the rear of the rear wheel house 114, and the auxiliary battery 111 mounted in this space is covered by a rear panel (not illustrated). It is also considered that the mounting space for the auxiliary battery 111 is formed so as to be adjacent to the mounting space for the main battery 110 and the blower motor 119 in the cargo room 113.

Figure 3:
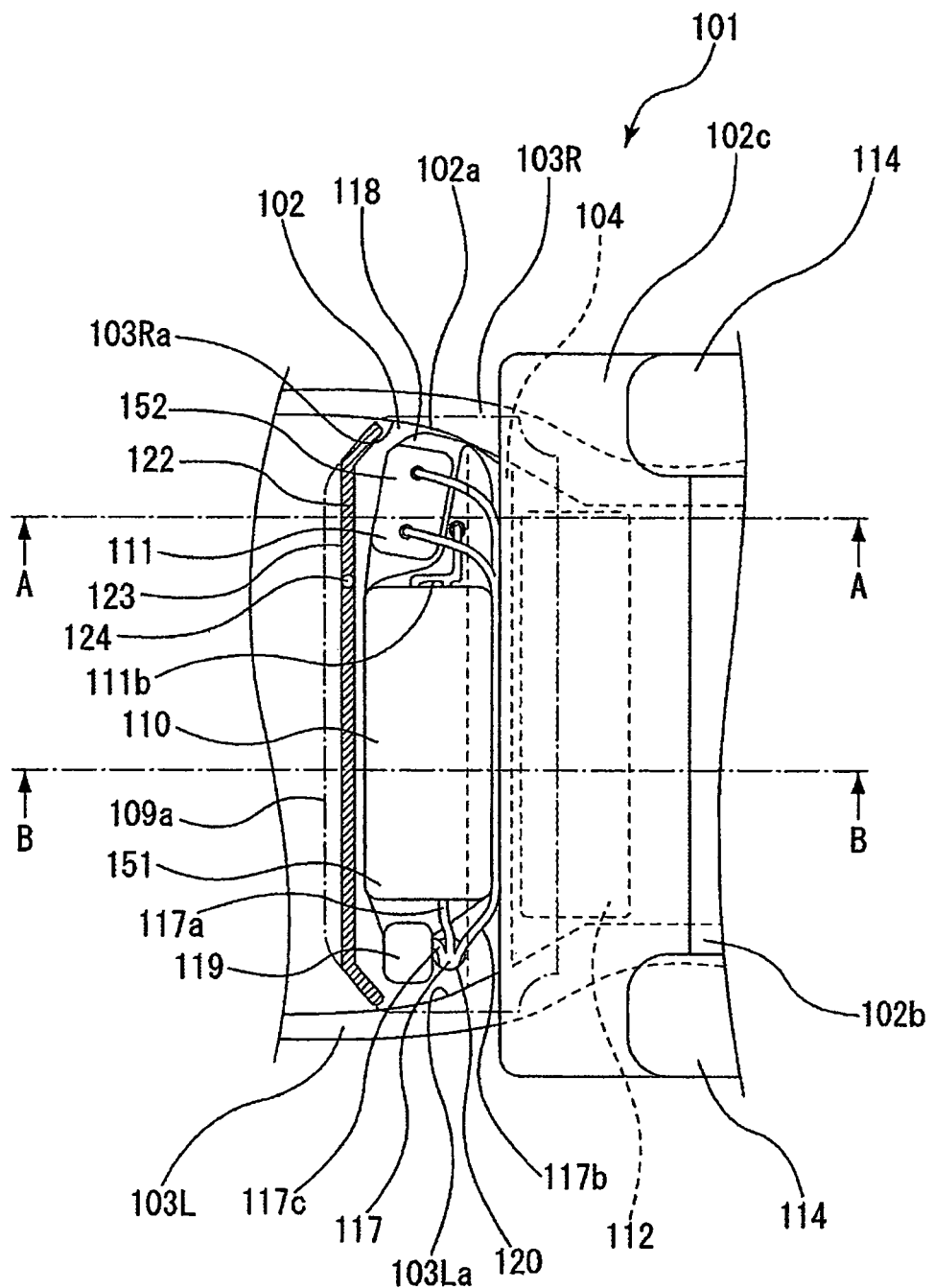
FIG. 3 is a plan view of the vehicle illustrating respective components below a rear seat.

FIG. 3 is a plan view of the vehicle 101 illustrating the components below the rear seat 109. FIG. 3 virtually illustrates the position where the seat portion 109a of the rear seat 109 is mounted with a one-dot-chain line. The frame 126 is not illustrated in FIG. 3. In the present embodiment, the main battery 110 and the auxiliary battery 111 are stored in the housing space SP. The height of the housing space SP is the height H (see FIG. 2) of the rising portion 102c with respect to the front portion 102a, so that it is higher than the fuel tank 112.

The left side member 103L and the right side member 103R project upward from the front portion 102a from both right and left sides of the front portion 102a of the floor panel 102, and form right and left wall faces of the housing space SP.

Specifically, a side face 103La of the left side member 103L forms a left wall face that defines the size of the housing space SP in the widthwise direction of the vehicle. A side face 103Ra of the right side member 103R forms a right wall face that defines the size of the housing space SP in the widthwise direction of the vehicle. Both of the left side member 103L and the right side member 103R support the left and right sides of the seat portion 109a of the rear seat 109 at their top surfaces.

The first mounting portion 151 for mounting the main battery 110 and the second mounting portion 152 for mounting the auxiliary battery 111 are arranged side by side in the widthwise direction of the vehicle in the housing space SP and on the top surface of the front portion 102a of the floor panel 102. The first mounting portion 151 is formed in the housing space SP so as to be close to the side face 103La of the left side member 103L. The second mounting portion 152 is formed in the housing space SP and between the first mounting portion 151 and the side face 103Ra of the right side member 103R. A through-hole 120 through which the wire harness 117 extends is formed between the first mounting portion 151 and the side face 103La of the left side member 103L, at the front portion 102a of the floor panel 102.

Figure 4:
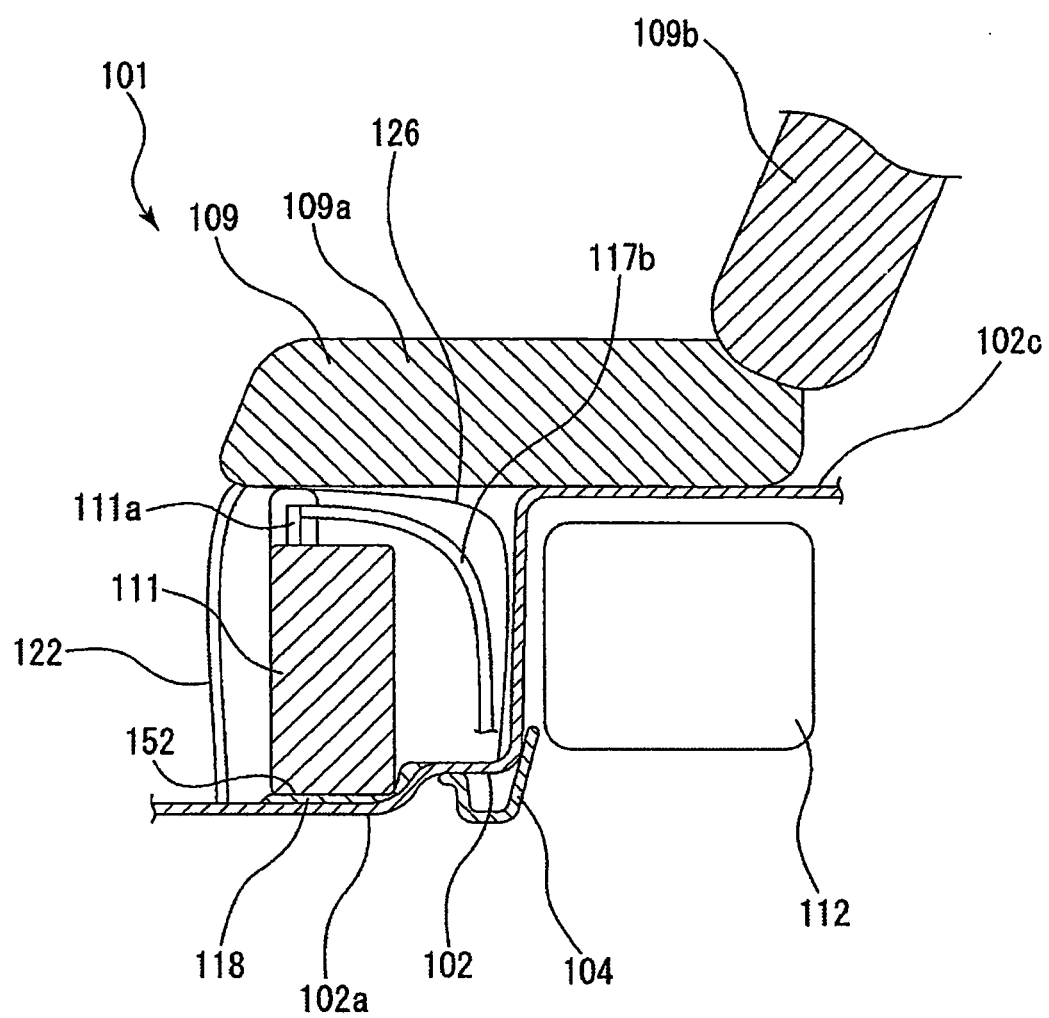
FIG. 4 is a sectional view taken along a line A-A in FIG. 3.

FIG. 4 is a sectional view taken along a line A-A in FIG. 3. The auxiliary battery 111 is mounted in the second mounting portion 152 so as to be positioned below the seat portion 109a of the rear seat 109 and above the front portion 102a of the floor panel 102. The auxiliary battery 111 is positioned in the second mounting portion 152 by a positioning member 118, and fixed by a mounting member (not illustrated) so as not to move due to the vibration of the vehicle 101. The positioning member 118 has a shape of holding the auxiliary battery 111, and is fixed on the front portion 102a of the floor panel 102. The positioning member 118 has a shape of holding the main battery 110 and the blower motor 119, and positions the main battery 110 to the first mounting portion 151.

FIGS. 3 and 4 will be referred to. A fixing cover 121 for covering the front part of the housing space SP is located in front of the main battery 110. The fixing cover 121 hangs down from the front end of the rear seat 109, and is connected to the front portion 102a of the floor panel 102. The right end of the fixing cover 121 substantially corresponds with the position of the right end of the main battery 110 mounted in the first mounting portion 151. The left end of the fixing cover 121 is connected to the side face 103La of the left side member 103L.

An opening 123 is formed at the right side of the fixing cover 121. The opening 123 is open at the front of the auxiliary battery 111. The outer periphery of the opening 123 is formed by the bottom surface of the seat portion 109a of the rear seat 109, the upper surface of the front portion 102a of the floor panel 102, the right end side of the fixing cover 121, and the side face 103Ra of the right side member 103R. A detachable cover 122 opens and closes this opening 123. For example, the detachable cover 122 is coupled to the right end side of the fixing cover 121 via a hinge 124 so as to be swingable in the forward direction of the vehicle 101. As another example, the detachable cover 122 may have a claw portion (not illustrated) engaged with the fixing cover 121 and the side face 103Ra of the right side member 103R, and the claw portion may be engaged with the fixing cover 121 and the side face 103Ra of the right side member 103R so as to prevent the detachable cover 122 from being detached from the opening 123, when the opening 123 is closed.

Figure 5:
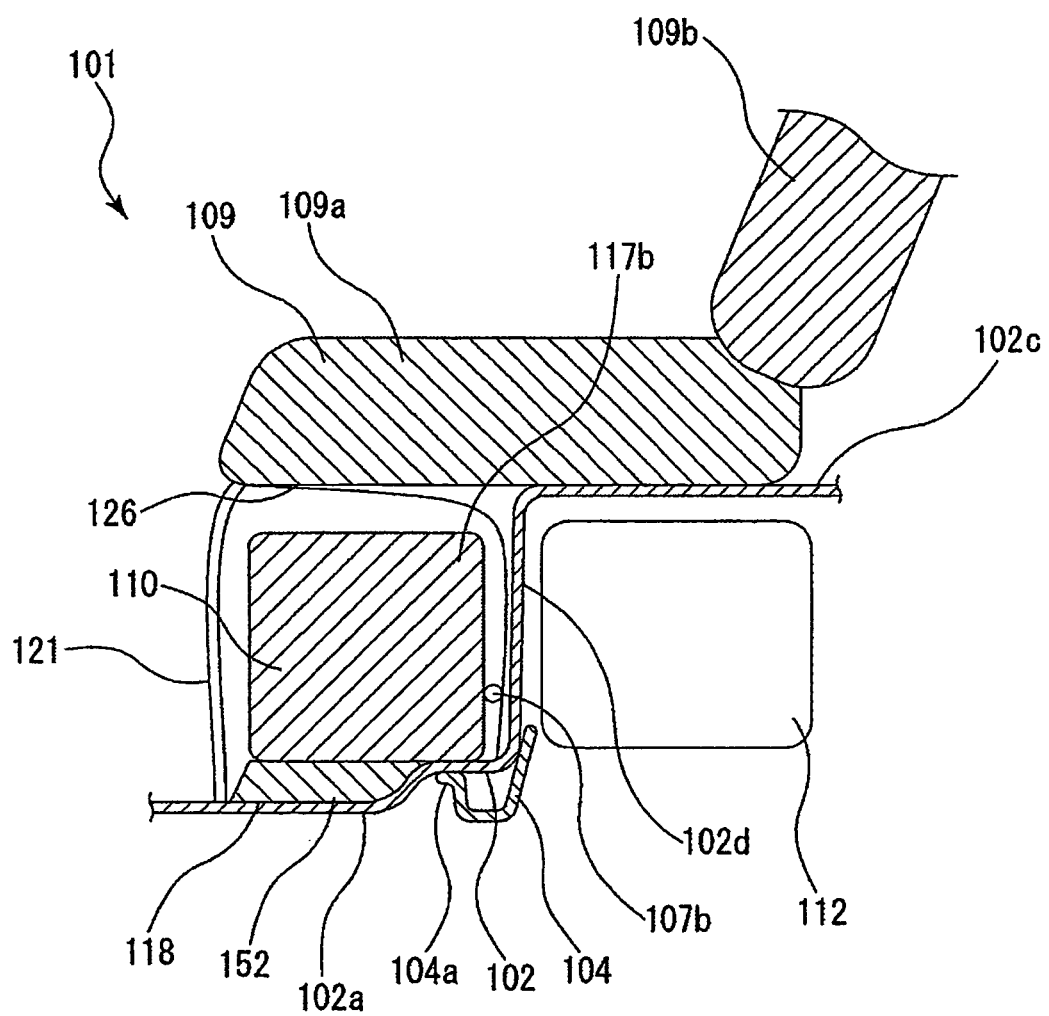
FIG. 5 is a sectional view taken along a line B-B in FIG. 3.

FIG. 5 is a sectional view taken along a line B-B in FIG. 3. The center cross member 104 is mounted on the bottom surface of the floor panel 102 at the portion extending across the front portion 102a and the rising portion 102c. The center cross member 104 is a member extending in the widthwise direction of the vehicle 101 for linking the left side member 103L and the right side member 103R. The section of the center cross member 104 has a U shape that is open upward. The end portion 104a at the front part of the center cross member 104 is in contact with the bottom surface of the front portion 102a. The end portion 104b at the rear of the center cross member 104 extends along the wall face 102d of the rising portion 102c extending in the vertical direction. The center cross member 104 supports the main battery 110 mounted in the first mounting portion 151 via the front portion 102a of the floor panel 102.

When the vehicle 101 thus configured is manufactured, the fuel tank 112 only has airtightness in order to store highly-volatile liquid fuel (such as, gasoline, alcohol) that is supplied to the engine, and the shape of the fuel tank 112 can relatively freely be formed. On the other hand, the degree of freedom in designing the main battery 110 and the auxiliary battery 111 is low. More specifically, the main battery 110 and the auxiliary battery 111 have stored therein plural battery cells and battery modules, so that the outer appearances thereof might be determined according to the shape of plural battery cells and battery modules and the connection position. Therefore, the degree of freedom in designing the main battery 110 and the auxiliary battery 111 is low.

In view of this, a manufacturer of the vehicle 101 according to the present embodiment moves the wall face 102d of the rising portion 102c to the rear to make the wall face close to the first rear cross member 105, and forms the rising portion 102c on the floor panel 102 to decrease the housing space SP, in order to secure the housing space SP sufficient for mounting the main battery 110 and the auxiliary battery 111 side by side below the seat portion 109a of the rear seat 109. Then, the manufacturer forms the fuel tank 112 into the shape fitted in the space enclosed by the first rear cross member 105, the intermediate beam 116, and the wall face 102d of the rising portion 102c, and arranges the fuel tank 112 in this space.

Next, the manufacturer arranges the main battery 110 in the first mounting portion 151 in the housing space SP and the auxiliary battery 111 in the second mounting portion 152, before mounting the seat portion 109a of the rear seat 109. Since the first mounting portion 151 and the second mounting portion 152 are formed side by side in the widthwise direction of the vehicle in the housing space SP, the manufacturer arranges the main battery 110 and the auxiliary battery 111 in the respective portions. Thereafter, the manufacturer connects the wirings 117a to 177c of the wire harness 117 to the terminal 110a of the main battery 110, the terminal 111a of the auxiliary battery 111, and the connection terminal (not illustrated) of the blower motor 119, and inserts the wire harness 117 into the through-hole 120. Then, the manufacturer covers the frame 126 over the housing space SP, and fixes the rear seat 109 on the rising portion 102c of the floor panel 102, the upper surface of the left side member 103L, and the upper surface of the right side member 103R. Thus, the rear seat 109 is positioned above the floor panel 102. The frame 126 is in contact with the bottom surface of the seat portion 109a of the rear seat 109 so as to support the seat portion 109a.

As described above, in the present embodiment, the housing space SP sufficient for storing the main battery 110 and the auxiliary battery 111 side by side can be secured at the portion below the rear seat 109, which portion is generally not used, in the internal structure of the vehicle 101 in which various components are fixedly mounted, which leads to low degree of freedom in the design. The main battery 110 and the auxiliary battery 111 are arranged side by side in this housing space SP. As a result, the main battery 110 and the auxiliary battery 111 are not arranged in the cargo room 113, which prevents the cargo room 113 from being narrowed. The main battery 110 and the auxiliary battery 111 are enclosed by the floor panel 102, the rear seat 109, the fixing cover 121, the detachable cover 122, the left side member 103L, and the right side member 103R, which makes them dust proof and which protects them against the cold. Since the auxiliary battery 111 is arranged near the main battery 110, the length of the wire harness 117 can be shortened, whereby the weight of the vehicle 101 and the production cost can also be reduced. The relay (not illustrated) linking the main battery 110 and the auxiliary battery 111 is also simplified. Further, there is no chance that the auxiliary battery 111 is mounted at the rear of the rear wheel house 114 that is liable to be hit. Specifically, the structure in which the auxiliary battery 111 is stored below the rear seat 109 according to the present embodiment is also applicable to a compact hatch-back vehicle having a short rear overhang, and hence, the degree of freedom in designing the outer appearance of the vehicle 101 is increased.

In the present embodiment, the fuel tank 112 is stored in the rising portion 102c. Therefore, the height of the vehicle 101 is reduced. The main battery 110 and the auxiliary battery 111 are arranged at the position near the driving surface of the vehicle 101 below the rear seat 109, and they are collectively arranged in the housing space SP, whereby the position of the center of gravity of the vehicle 101 becomes low, and the stable driving of the vehicle 101 can be realized. Since the main battery 110, the auxiliary battery 111, and the fuel tank 112 are all collectively arranged at the central part and lower part of the vehicle 101, it can be prevented that the vehicle 101 is broken due to the shock applied to the vehicle 101 by a hit, without applying a special reinforcement.

In the present embodiment, the center cross member 104 not only connects the left side member 103L and the right side member 103R so as to enhance the rigidity of the vehicle 101, but also supports the main battery 110. Therefore, it becomes unnecessary to make the floor panel 102 strong in order to allow the floor panel 102 to endure the weight upon mounting the main battery 110.

In the present embodiment, a worker can easily maintain or exchange the auxiliary battery 111 by opening and closing the detachable cover 122.

Next, another embodiment of the present invention will be described with reference to FIG. 6. This embodiment is referred to as a second embodiment for the sake of convenience of description. In the present embodiment, the components same as those in the first embodiment are identified by the same numerals, and the description will not be repeated.

Figure 6:
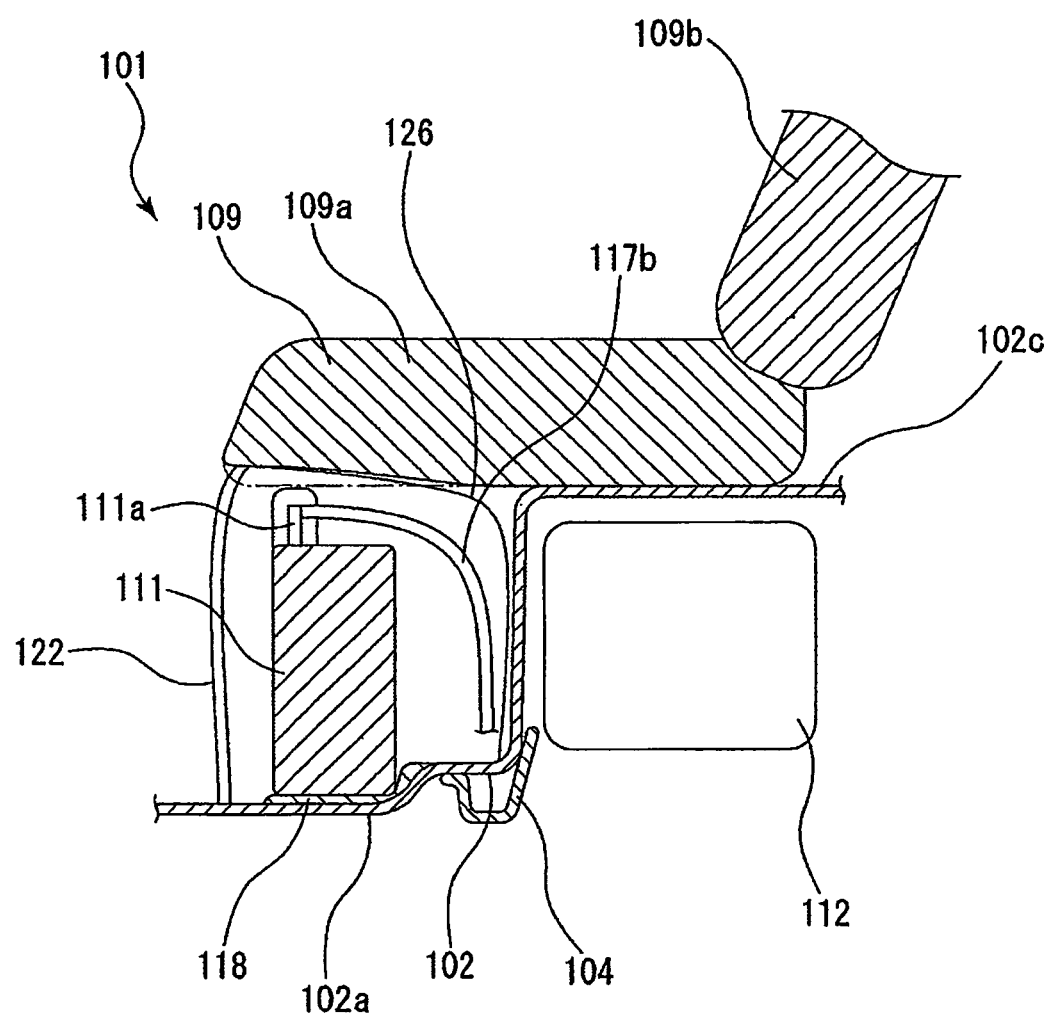
FIG. 6 is a sectional view taken along the line A-A in FIG. 3 according to a second embodiment.

FIG. 6 is a sectional view taken along the line A-A in FIG. 3 according to the present embodiment. In the present embodiment, the portion on the bottom surface of the seat portion 109a of the rear seat 109 and above the terminal 111a of the auxiliary battery 111 is recessed upward.

In the present embodiment, the worker utilizes the space between the terminal 111a of the auxiliary battery 111 and the seat portion 109a of the rear seat 109, and the worker opens the detachable cover 122 to be capable of efficiently carrying out the operation of maintaining or exchanging the auxiliary battery 111. The efficient operation described above does not lead to the change in the appearance of the rear seat 109.

REFERENCE SIGNS LIST

101 Hybrid vehicle
102 Floor panel
102a Front portion
102c Rising portion
104 Center cross member
112 Fuel tank
109 Rear seat
109a Seat portion
110 Main battery (first battery)
111 Auxiliary battery (second battery)
121 Fixing cover
122 Detachable cover
151 First mounting portion
152 Second mounting portion
SP Housing space

The invention claimed is:

1. A hybrid vehicle comprising:
a floor panel extending along and about a longitudinal axis defining a longitudinal direction, a width axis defining a widthwise direction and a height axis defining a heightwise direction, the longitudinal axis, the width axis and the height axis perpendicularly intersecting one another at a common point to define a conventional Cartesian coordinate system, the floor panel including a rising portion extending in the longitudinal and widthwise directions a front portion extending in the longitudinal and widthwise directions and a wall face portion extending in the heightwise and widthwise directions and integrally connected to and between the front portion and the rising portion to form a stepped-down configuration from the rising portion to the front portion;
a fuel tank that stores liquid fuel burned in an engine serving as a power source of the vehicle;
a rear seat provided above the floor panel with a bottom seat portion that supports a passenger, the bottom seat portion having a forward bottom seat section and a rearward bottom seat section integrally connected together at a bottom seat interface as viewed in cross-section along the longitudinal and heightwise directions;
rear wheel houses arranged at sides of the vehicle in the widthwise direction and at the rear of the rear seat; and
left and right side members having respective top surfaces, the left and right side members extend in a longitudinal direction of the vehicle, and project upward from each of left and right sides of the front portion so as to support left and right sides of the bottom seat portion of the rear seat with the top surfaces,
wherein the rearward bottom seat section facially opposes the rising portion,
the rising portion and the wall face portion define, in part, an exterior housing space sized to house the fuel tank,
the front portion, the wall face portion and the forward bottom seat section define, in part, an interior housing space,
the forward bottom seat section facially opposes the front portion to form a ceiling wall of the interior housing space,
the length of the interior housing space, defined by the side members, in the widthwise direction of the vehicle is larger than the distance between the rear wheel houses in order that a first mounting portion and a second mounting portion are formed,
the first mounting portion being for mounting a first battery in the interior housing space which stores driving power of an electric motor serving as the power source of the vehicle; and
the second mounting portion being formed in the interior housing space as being side by side with the first mounting portion in the widthwise direction of the vehicle so as to mount a second battery which assists a power supply by the first battery.

2. The hybrid vehicle according to claim 1, further comprising:
a center cross member that is provided below the floor panel and at the position linking the front portion and the rising portion, and extends in the widthwise direction of the vehicle so as to support the first battery mounted in the first mounting portion through the floor panel, at the position immediately below the first battery.

3. The hybrid vehicle according to claim 1, further comprising:
a cover that is mounted in front of the first mounting portion and the second mounting portion for covering a front face of the interior housing space,
wherein a portion of the cover at the front of the second mounting portion can be opened and closed.

4. The hybrid vehicle according to claim 2, further comprising:
a cover that is mounted in front of the first mounting portion and the second mounting portion for covering a front face of the interior housing space,
wherein a portion of the cover at the front of the second mounting portion can be opened and closed.

5. The hybrid vehicle according to claim 1, further comprising:
a frame that supports the seat portion of the rear seat.

6. The hybrid vehicle according to claim 1, wherein the bottom seat interface extends in the heightwise direction and is disposed approximately centrally of the bottom seat portion as viewed in cross section along the longitudinal and heightwise directions.

7. A hybrid vehicle comprising:
- a floor panel including a rising portion that rises upward and extends in a widthwise direction of a vehicle, and a front portion that extends in a forward direction of the vehicle from the rising portion and a wall face portion extends in a upward direction of the vehicle from the rising portion;
- a fuel tank that is mounted below the floor panel, and that stores liquid fuel burned in an engine serving as a power source of the vehicle;
- a rear seat provided above the floor panel with a seat portion that supports a hip of a passenger being opposite to the front portion the seat portion having a forward seat section and a backward seat section;
- rear wheel houses arranged at sides of the vehicle in the widthwise direction and at the rear of the rear seat; and
- left and right side members, which extend in a longitudinal direction of the vehicle, and project upward from each of left and right sides of the front portion so as to support left and right sides of the seat portion of the rear seat with the top surfaces and define a housing space of a battery together with the front portion, the seat portion, and the rising portion, wherein the backward seat section opposed the rising portion, the rising portion and the wall face portion define an exterior housing space sized to house to the fuel tank, the front portion, the rising portion and the forward seat section define an interior housing space, the length of the interior housing space, defined by the side members, in the widthwise direction of the vehicle is larger than the distance between the rear wheel houses in order that a first mounting portion and a second mounting portion are formed, the first mounting portion being for mounting a first battery in the interior housing space, which stores driving power of an electric motor serving as the power source of the vehicle, and the second mounting portion being formed in the interior housing space as being side by side with the first mounting portion in the widthwise direction of the vehicle so as to mount a second battery, which assists a power supply by the first battery.

* * * * *